US012062908B2

(12) United States Patent
Lapassat (10) Patent No.: US 12,062,908 B2
(45) Date of Patent: Aug. 13, 2024

(54) STATIC DC CURRENT-LIMITING SWITCHING SYSTEM

(71) Applicant: GE ENERGY POWER CONVERSION TECHNOLOGY LIMITED, Warwickshire (GB)

(72) Inventor: Nicolas Lapassat, Villebon-sur-Yvette (FR)

(73) Assignee: GE ENERGY POWER CONVERSION TECHNOLOGY LIMITED, Warwickshire (GB)

(*) Notice: Subject to any disclaimer, the term of this patent is extended or adjusted under 35 U.S.C. 154(b) by 364 days.

(21) Appl. No.: 17/430,236

(22) PCT Filed: Feb. 3, 2020

(86) PCT No.: PCT/EP2020/052602
§ 371 (c)(1),
(2) Date: Aug. 11, 2021

(87) PCT Pub. No.: WO2020/164945
PCT Pub. Date: Aug. 20, 2020

(65) Prior Publication Data
US 2022/0115863 A1  Apr. 14, 2022

(30) Foreign Application Priority Data
Feb. 11, 2019 (EP) .................... 19156383

(51) Int. Cl.
*H02H 9/02* (2006.01)
*H01H 33/59* (2006.01)
*H02H 3/093* (2006.01)

(52) U.S. Cl.
CPC .......... *H02H 9/025* (2013.01); *H01H 33/596* (2013.01); *H02H 3/093* (2013.01)

(58) Field of Classification Search
CPC ......... H02H 9/025; H02H 9/026; H02H 3/093
See application file for complete search history.

(56) References Cited

U.S. PATENT DOCUMENTS 5,121,281 A  6/1992  Pham et al.
8,830,708 B2  9/2014  Berggren et al.
(Continued)

FOREIGN PATENT DOCUMENTS

EP       3300252 A2    3/2018
WO    2020/164945 A1   2/2020

OTHER PUBLICATIONS

J. Magnusson, R. Saers, L. Liljestrand and G. Engdahl, "Separation of the Energy Absorption and Overvoltage Protection in Solid-State Breakers by the Use of Parallel Varistors," in IEEE Transactions on Power Electronics, vol. 29, No. 6, pp. 2715-2722, Jun. 2014 (Year: 2014).*

(Continued)

*Primary Examiner* — Peter M Novak
(74) *Attorney, Agent, or Firm* — WOOD IP LLC (57) ABSTRACT

This electrical protection system for a DC-current medium-voltage electrical circuit, comprising a disconnection module, for generating a counter-voltage greater than the voltage of the source for a current flowing therethrough that is equal to at most a few percent of the nominal current of the device, a resistive limitation module connected between a first terminal and a second terminal and configured so as to reduce the intensity of the output current of the protection system in order to limit the current between a value and upon a low impedance fault downstream of the device, and a primary switching module coupled in parallel across the disconnection module and the resistive module. The primary switching module is configured so as to switch between a first state in which the primary switching module is conductive and a second state in which the primary switching (Continued)

module forms a short circuit. Control means for controlling the primary switching module are configured so as to switch the primary switching module as soon as the current flowing in the first terminal reaches an upper limit value as lower value or a lower limit as upper value.

6 Claims, 7 Drawing Sheets

(56) References Cited

U.S. PATENT DOCUMENTS

| | | |
|---|---|---|
| 9,455,575 B2 | 9/2016 | Trainer et al. |
| 9,692,226 B2 | 6/2017 | Davidson |
| 10,348,079 B2 | 7/2019 | Yasusaka |
| 10,468,873 B2 | 11/2019 | Luscan |
| 2015/0236498 A1* | 8/2015 | Davidson ............... H03K 17/74 361/57 |
| 2017/0365998 A1* | 12/2017 | Luscan ................ H01H 33/596 |
| 2018/0062384 A1 | 3/2018 | Mothais |
| 2022/0165524 A1* | 5/2022 | Grieshaber ............ H01H 9/542 |

OTHER PUBLICATIONS

International Search Report from International Appl. No. PCT/EP2020/052602, mailed Apr. 14, 2020.
Xue et al. "Protection Principle for a DC Distribution System with a Resistive Superconductive Fault Current Limiter," Energies, 2015, 8, pp. 4839-4852; doi: 10.3390/en8064839.

* cited by examiner

STATIC DC CURRENT-LIMITING SWITCHING SYSTEM

TECHNICAL FIELD

This description concerns the overload protection of direct current electrical systems and installations.

It relates more particularly to a current limitation and cut-off system for a direct voltage distribution network allowing limiting the current in a downstream circuit while maintaining an adequate value to allow the selectivity of the downstream protections. The cut-off function is also integrated into the system.

BACKGROUND

Ways to protect an electrical circuit by limiting the overload current are known. The French patent no 81 09 707, for example, associates a circuit breaker with a high voltage direct current limiter for which the passage of a fault current causes a heating of the resistor, whose resistance value increases very fast. The significant reduction in the overload current facilitates its cut-off by a circuit breaker. This solution is bulky because the relatively high resistance value of ceramics is directly proportional to the space requirement of the resistor.

It is also known that the cut-off of the overload currents of the direct current lines is a difficult problem, since, as for the cut-off of the alternating currents, the zero passage of the current is not available. The document U.S. Pat. No. 9,455,575B2 proposes, on a high voltage line comprising an AC/DC converter, to introduce a source of DC counter voltage sufficiently high to allow the reduction and cancellation of the direct current.

These implementations are only adapted for alternating current or for high voltage which is characterized by particularly bulky installations. The inductance of a circuit is the main element limiting the alternating voltage fault current, with an influence which is more significant than the resistance whose value is reduced to reduce the losses by Joule's effect in the power supply conductors. In direct current, the presumed fault current is the consequence of the resistance of the distribution circuit, which is reduced to limit the losses. The presumed fault currents can therefore be particularly greater than in alternating current. Sizing the circuit elements on very significant fault currents is penalizing. The current limiting function allows overcoming this problem. The limitation is maintained for a predetermined duration, linked to the action time of the downstream protection devices.

Another option is the automatic opening of a circuit breaker but this disconnects a portion of the network. After the fault is thwarted, the connected portion must go through a restart phase and a series of checks before a reconnection is possible. This leads to a prolonged interruption and therefore to an unavailability of the circuit.

A continuous circuit breaker function is also required in addition to the limiting function. This protection can act on an external opening order, or even locally if the limited fault current exceeds a certain time. This allows obtaining a protection in the case of a fault located upstream of the downstream protections, or ensuring the ultimate cut-off in the case of failure thereof.

SUMMARY

The system according to the present description aims at overcoming at least some of the aforementioned drawbacks by associating limiting means, which for example is a passive component, with a cut-off device, for example a static switch, coupled to an overload absorber, to allow transiently maintaining a controlled fault current at a value for preventing damaging the upstream and downstream circuits, but at the same time high enough to enable the selectivity of the protections of the downstream fault start, without necessarily triggering the entire downstream circuit. If the fault has not been eliminated by a downstream device (for example if the fault appears on the common direct current bus), the circuit then interrupts the current after a determined time, this time being greater than the cut-off time of the downstream protection circuits.

A protection system against direct current and medium voltage overloads is therefore proposed, allowing both limiting and cutting-off the current, while benefiting from a particularly reduced space requirement. The invention proposes a combination of these two functions by using a single main pole, in order to reduce the overall space requirement of the device.

An electrical protection system for direct current and medium voltage electrical circuit is also proposed, comprising a voltage clipper system connected between a first terminal and a second terminal and configured to produce a counter-voltage for a current capable of decreasing the intensity of the output current of the protection system, and a main switching module coupled in parallel to the voltage clipper system, the main switching module being configured to switch between a first state in which the main switching module is turned on and a second state in which the main switching module forms a cutout. The protection system further comprises means for controlling the main switching module which are configured to position the main switching module in the second state as soon as the current flowing in the first terminal reaches a high limit value by a lower value.

Advantageously, the control means are configured to switch the main switching module into the first state as soon as the intensity of the current passing through the second terminal reaches a low limit value by an upper value and the main switching module is in the second state.

In one embodiment, the cut-off branch further comprises a first auxiliary switching module which is coupled in series with the voltage clipper system.

Preferably, the voltage clipper system is a non-linear resistive element which comprises a metal oxide.

In one embodiment, the electrical protection system further comprises a limiting branch which is coupled in parallel with the main switching module between the first terminal and the second terminal, said limiting branch comprising a resistive limiting module.

Advantageously, the limiting branch further comprises a second auxiliary switching module which is coupled in series with the current limiting module.

Advantageously, the limiting module comprises a material whose volume heat capacity exceeds 2 $J/cm^3/°C$.

Preferably, the main switching module comprises a conduction electrode and the control means are configured to control the opening of the main switching module depending on the variation of an electrical magnitude of the conduction electrode thereof.

Advantageously, the protection system can be included in a parallelepiped having a volume less than one cubic meter for a power transited from about MVA and a limitation of the current in the case of a fault to twice the nominal value thereof for 0.2 seconds.

BRIEF DESCRIPTION OF THE DRAWINGS

The invention will be better understood on the detailed study of some embodiments taken by way of non-limiting examples and illustrated by the appended drawings, in which.

DETAILED DESCRIPTION

Unless otherwise specified, the terms "approximately", "substantially", "about", "of the order of", etc. mean that a slight variation relative to the considered nominal value is possible, in particular by a small percentage, in particular to within 10%.

Figure 1:
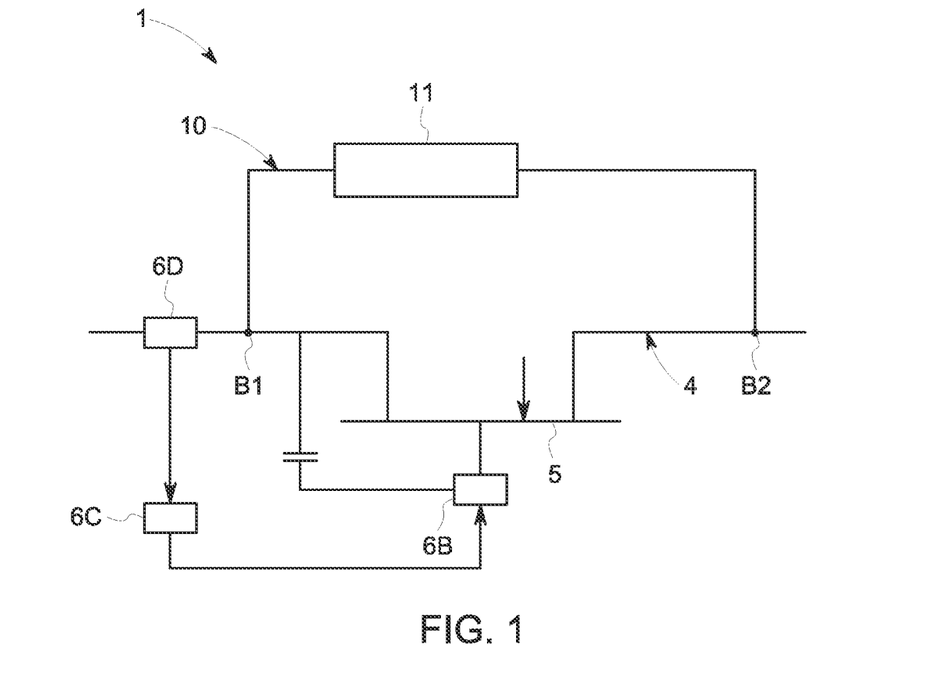
FIG. 1 illustrates the protection system according to a first embodiment.
Figure 5:
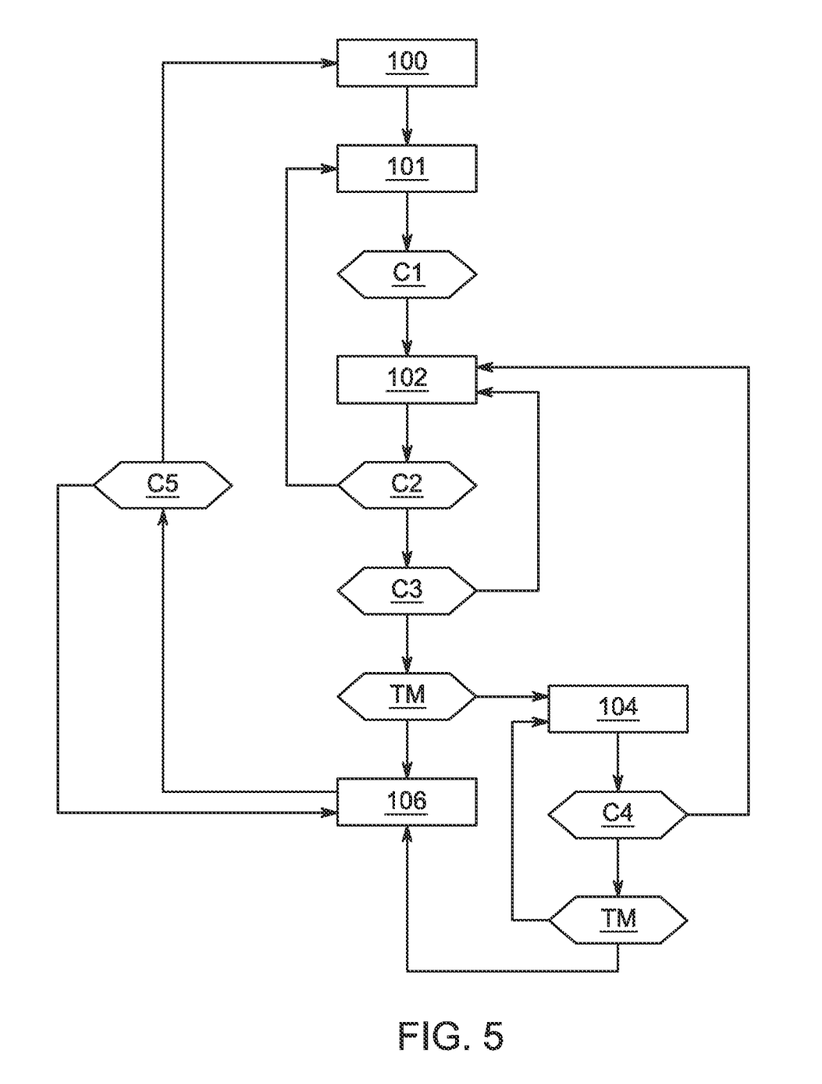
FIG. 5 illustrates the operation of the protection system according to the first embodiment of FIG. 1.

FIG. 1 is a schematic representation of a first embodiment of the protection system 1. The operation thereof is illustrated in the diagram of FIG. 5. It allows carrying out a current limitation and a cut-off by a counter-voltage produced by the voltage clipper system 11.

Figure 2:
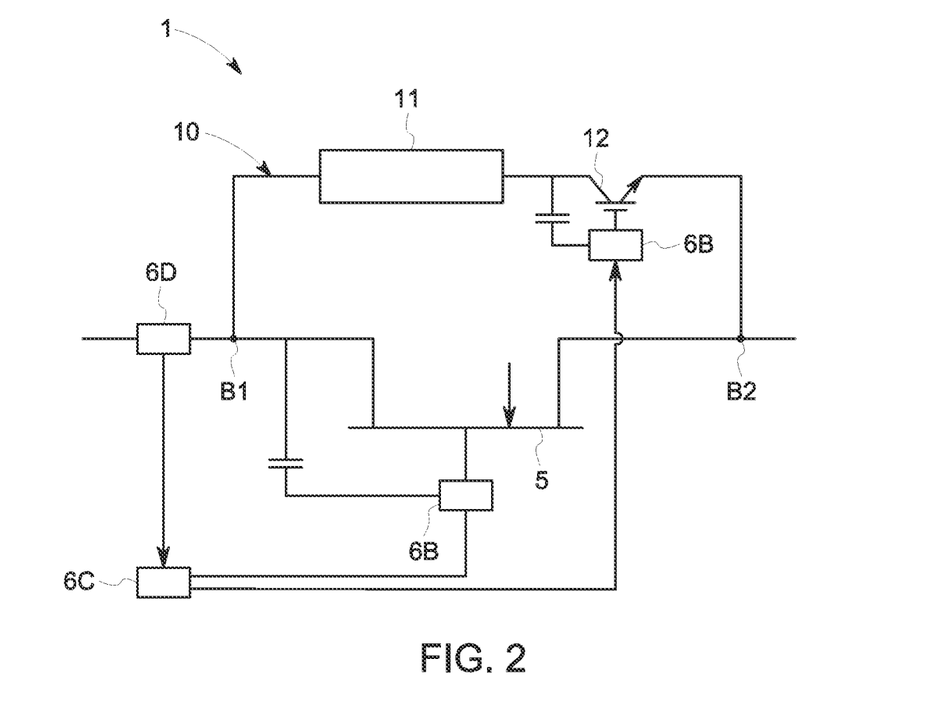
FIG. 2 illustrates the protection system according to a second embodiment.
Figure 6:
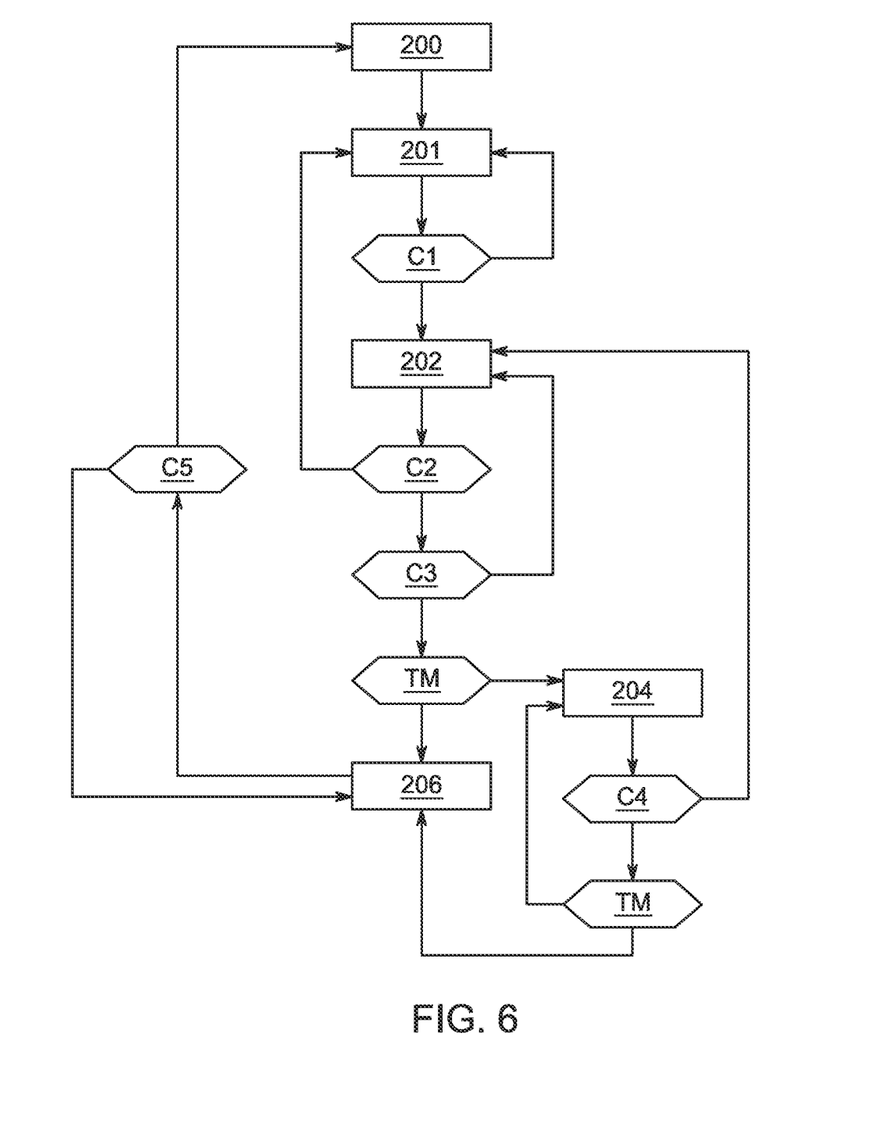
FIG. 6 illustrates the operation of the protection system according to the second embodiment of FIG. 2.

FIG. 2 is a schematic representation of a second embodiment of the protection system 1. The operation thereof is illustrated in the diagram of FIG. 6. It allows choosing a counter-voltage during the limitation and cut-off modes which is independent of the capacity of the voltage clipper system 11 to withstand a permanent direct voltage.

Figure 3:
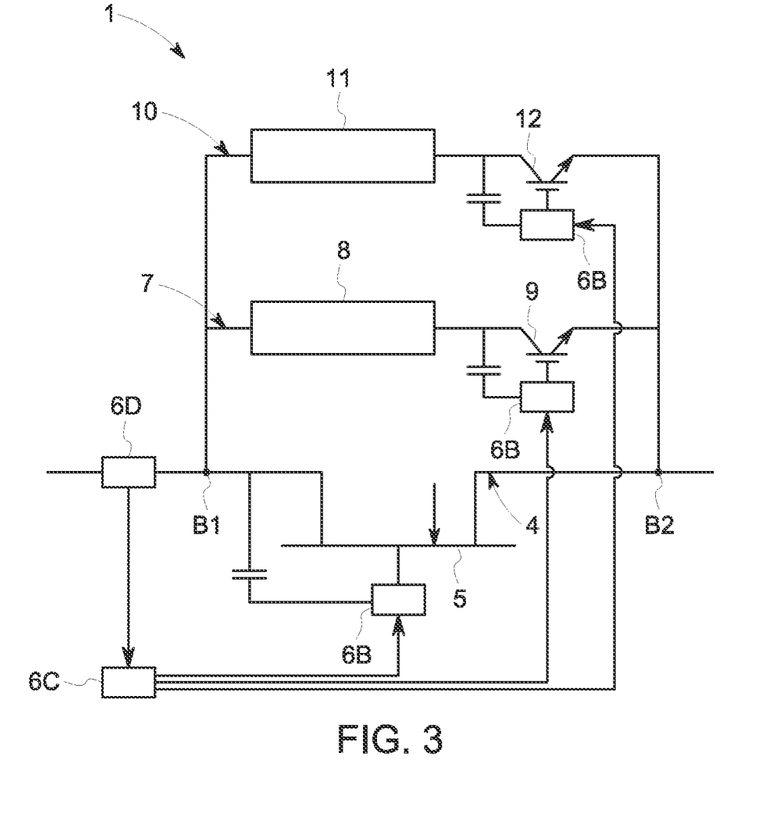
FIG. 3 illustrates the protection system according to a third embodiment.
Figure 7:
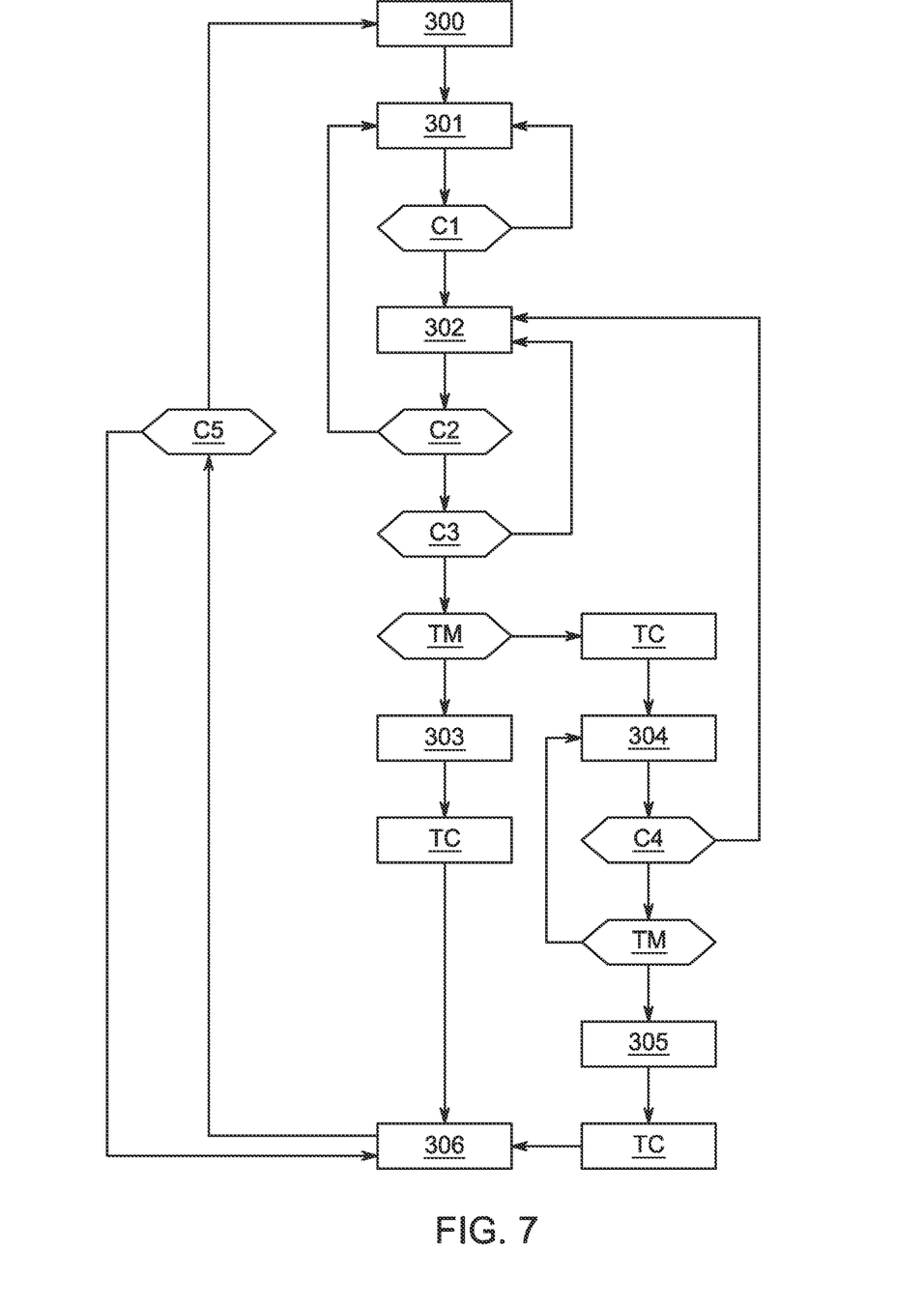
FIG. 7 illustrates the protection system according to the third embodiment of FIG. 3.

FIG. 3 is a schematic representation of a third embodiment of the protection system 1. The operation thereof is illustrated in the diagram of FIG. 7. It allows both cutting-off and limiting, in the case of a current overload, a medium voltage direct current line while preventing the energy dissipated during the limitation from being dissipated in the voltage clipper system 11, thus allowing increasing the service life thereof.

Figure 4:
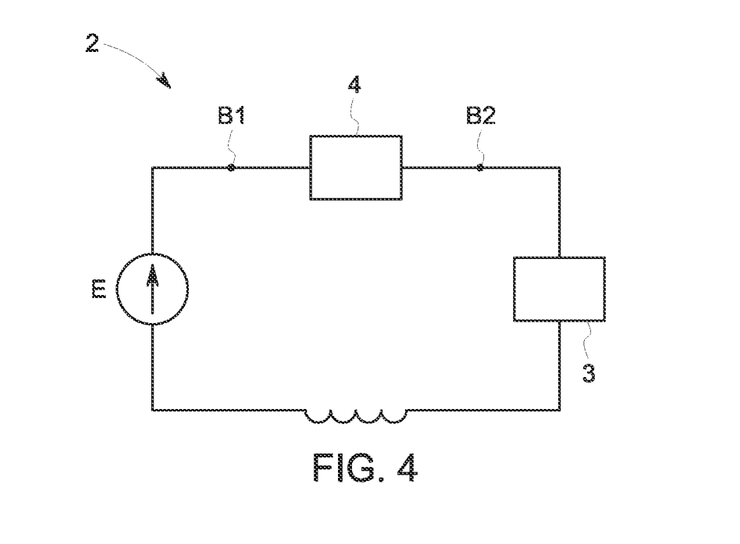
FIG. 4 illustrates the protection system coupled to an electronic circuit to be protected.

As illustrated in FIG. 4, the protection system 1 is intended to be integrated between two terminals of a medium voltage direct current electrical circuit 2, to limit the fault current in the line in case of occurrence of a fault in the downstream circuit 2, and to cut-off this fault current if it has not disappeared after a predetermined time TP. The circuit 2 may also include other protection systems against the fault currents placed downstream of the electrical protection system 1. The electrical protection system 1 is particularly compact, unlike the existing high voltage systems. It is integrated in particular in a volume less than a cubic meter for a capacity of 10 MW transited with a limitation to twice the nominal current for two hundred milliseconds.

It may include at least two identical sets inserted respectively in series on the same circuit, with each set connected in one of the two polarities of the continuous distribution network. A single system 1 is represented in FIG. 4.

The protection system 1 has a first terminal B1 and a second terminal B2 between which a main branch 4 extends. For example, the first terminal B1 can be coupled to a medium voltage current source, and the second terminal B2 is coupled to an electrical load 3 comprising an electrical distribution network, whose branches may include their own protections, with a current rating less than the current rating of the element 1. It can be considered that, in the illustrated example, the first terminal B1 is an upstream or current input terminal, while the second terminal B2 is a downstream or current output terminal in the direction of current flow. However, the first terminal B1 and the second terminal B2 are interchangeable in the present description and can constitute indifferently an anode and a cathode. The protection system 1 according to one embodiment can be reversible, such that current flow could be provided through the protection system 1 in the reverse direction. The use of current and voltage-reversible interrupters, or of current reversing switches known per se can be provided to more easily configure the protection system 1 on a circuit 2.

The upstream and downstream components 3 of the circuit 2 operate for an electric current comprised within an operating range below a nominal value. A low threshold value VB and a high threshold value VH are defined above the nominal value, which correspond to thresholds between which the system will limit the current. The main branch 4 is intended to be passed through by a nominal current of an intensity In which is less than the low VB and high VH threshold values which are for example respective values of two hundred percent and two hundred and twenty percent of the nominal value of the current. The term "nominal value of the current" means the value of the direct current absorbed by the circuit 3 during a normal operation of the system. The components 3 of the circuit 2 can in particular comprise several electrical protection systems downstream to the system 1, intended to eliminate the fault current. The system 1 then limits the fault current within a range capable of allowing the opening of the protections of the circuit 2 if the fault is downstream of these protections. If the protections of the circuit 2 have not operated within a predetermined period of time TP, or if the fault is located downstream of the circuit 1 but upstream of the protections of the circuit 2, then the circuit 1 proceeds after the limiting phase of the current, after a predetermined time TP, with the opening of the protection circuit 2.

The system 1 is inserted in particular, but not exclusively, in an installation using high voltage A (or HTA), or medium voltage (MT) which exceeds one thousand five hundred volts without exceeding twenty thousand volts in direct current. Such a protection system 1 could for example be dimensioned for a nominal current of the order of a few kiloamperes and direct voltages at least equal to ten kilovolts, or even at least equal to twenty kilovolts. Such a protection system 1 could also be dimensioned for a nominal operating direct current at least equal to one kiloampere, or even at least equal to three kiloamperes.

In all embodiments, the main branch 4 comprises a main switching module 5. The main switching module 5 is a static contactor. For example, the main switch 5 is of the insulated-gate field effect transistor (MOSFET) type. Alternatively, the main switch 5 can be a semiconductor switch having an insulated gate (IGBT). It has intrinsic inductive and resistive characteristics. The main switch 5 has in particular a slight resistivity in the turned-on state and a maximum limit of the possible switching frequency thereof. Several switches can be coupled in series in the main band 4 to make the main switching module 5, so as to distribute the voltage on the switches which are connected in series.

As illustrated in FIG. 1, the main switch 5 has connections to be controlled by control means 6B and of connections for the power. The main switch 5 can be opened or closed by the control means 6B. The power circuit consists of electronic power components, such as a field effect transistor or an IGBT, because it is necessary that the component is controlled to the opening, on the one hand, and that it could be controlled with a monitoring called "dv/dt monitoring", on the other hand.

Thanks to the control means 6B, the protection system 1 is in particular configured to switch, as indicated in FIGS. 1 to 3, between a first state 101, 201, 301, in which the main switch 5 is turned on and a second state 104, 204, 304 in which the main switch 5 forms a cutout of the main branch 4. For example, the main switching module 5 comprises a conduction electrode and the control means 6B are configured to voltage-control the opening of the main switching module 5 depending on the variation of an electrical magnitude of the conduction electrode thereof. The main switch 5 may further comprise a capacitor connected to one of the electrodes thereof, in particular between the drain or the emitter thereof, and the gate thereof, and be controlled according to the voltage at the terminals of the capacitor. The monitoring called "dv/dt monitoring" of a transistor with a feedback on the gate thereof via a capacitor constitutes a "snubber" type circuit known to the person skilled in the art.

As illustrated in FIG. 1, the protection system 1 further comprises a cut-off branch 10, coupled between the first terminal B1 and the second terminal B2 in parallel with the main branch 4, and comprising a voltage clipper system 11. For example, the voltage clipper system 11 comprises one or several varistor type non-linear resistive element(s) 11. For example, the varistor 11 is an element comprising zinc oxide particles which is strongly non-linear and which follows an exponential voltage/intensity characteristic, where the voltage is for example proportional to a power of thirty of the intensity. The cut-off branch 10 produces a counter-voltage which is greater than the voltage of the source such that it can lower the current to an almost zero value corresponding to its leakage current for a voltage which is equal to that of the source.

With reference to FIG. 5 which illustrates the operation of the system 1 according to the first embodiment of FIG. 1, the main switch 5 is kept closed in the usual case.

The system 1 is stopped during step 100, in which case the branch 4 is cut.

The system 1 is started during step 101 by closing the main branch 4. This is the nominal operating mode of the system, which lasts as long as the current remains within its nominal range and that no external stop order is sent to the main interrupter.

The comparison step C1 consists in comparing that the current I delivered by the first terminal B1 exceeds the nominal value In.

If I does not exceed the value In, the first state 101 of the system 1 is maintained. If it is checked that I exceeds In (I>In), the system 1 goes to step 102.

During step 102, the main branch 4 remains closed. If the current remains below the threshold VH but greater than In, then one in an overload regime. The duration of this regime can be limited by a time TS, which is the overload time beyond In, predetermined or indexed on the overload level. This allows protecting the circuit from a prolonged overload. An alternative method may consist in using a temperature limit value of the component 5 rather than the delay TS to proceed with the opening.

During step C2, one further compares I to In. If one does not have I>In, the overload fault has been eliminated and the system 1 returns to the first state 101. If I>In, the overload is decreased but not eliminated, step C2 continues with step C3.

During step C3, the relationship I>VH is assessed. If I<VH is checked, one remains in the state 102. If I>VH is checked, it is a low impedance fault and the process continues with a step TM.

The step TM checks that the time elapsed from an instant TD initiated as soon as the current exceeds the threshold VH does not exceed a maximum allowable fault time. If this maximum duration has not been reached, the system 1 goes to step 104. If the maximum duration has been reached during step TM, the system 1 goes to step 106.

During step 104, the main branch 4 is opened and the system 1 goes to step C4.

The step C4 is, as in the first embodiment, a comparison between I and VB. If I is below the low threshold value VB, the system returns to step 102, otherwise it goes again to a step TM.

The step TM checks that the time elapsed from TD does not exceed the maximum time which is predetermined, and defined to allow the action of the downstream protection systems. If this maximum duration of use has not been reached, the system 1 remains in step 104. If the maximum duration has been reached during step TM, the system 1 goes to step 106.

During step 106, the system 1 has reached the duration TM which is the maximum allowable duration of fault current in the system 1. The main interrupter 5 is kept open. The current passes through the branch 10. The counter-voltage generated by the voltage clipper system 11 causes the current to drop to a low value corresponding to the residual leakage current of the voltage clipper system 11 when the input voltage of the line, delivered by the source indicated in FIG. 4, is applied to the terminals thereof. Since in this embodiment the clipper 11 is dimensioned to withstand the input direct voltage, its leakage current at this direct voltage will be typically less than one milliampere. Step 106 leads to step C5.

During step C5, the current is compared to a residual current detection threshold Ires, typically of the order of a milliampere in this embodiment. As soon as the current naturally exceeds this threshold, one returns to step 100, otherwise one returns to step 106.

As illustrated in FIG. 2 which illustrates the second embodiment of the system 1, the voltage clipper system 11 can be coupled in series with a first auxiliary switching module 12. The first auxiliary switch 12 is kept open in the usual case, that is to say during steps 200 and 201, for the second embodiment illustrated in FIG. 2. It can also be kept always closed during steps 202-204-206 and the system 1 can then be used as the first embodiment as described above if an overload fault is eliminated by the downstream circuit.

With reference to FIG. 6 which illustrates the operation of the system 1 according to the second embodiment, the system 1 may be stopped during step 200, in which case the branches 4 and 10 are cut.

The system 1 is started in step 201 by closing the main branch 4 and keeping the cut-off branch 10 open.

The comparison step C1, as in the first embodiment, consists in comparing that the current I delivered by the first terminal B1 exceeds the nominal value In, that is to say has an increasing tendency beyond the nominal current In.

If I does not exceed In, the first state 201 of the system 1 is kept. If it is checked that I exceeds In (I>In), the system 1 goes to step 202.

In step 202, the main branch 4 remains closed and the cut-off branch 10 is closed. A new value TS marks the instant from which I>In is detected.

During step C2, one further compares I to In. If one does not have I>In, the overload fault has disappeared (I<In) and the system 1 returns to the first state 201. If I>In, step C2 continues with step C3.

During step C3, the relationship I>VH is assessed. If the inequality I>VH is not checked, the system 1 returns to step 202 which can lead it, by the comparison C2, to the first state 201 if the overload has disappeared (I<In). If I>VH is checked, there is a low impedance fault and the process continues with a step TM.

The step TM checks that the time elapsed from TD, which corresponds to the initial instant of the detection I>VH, does not exceed the maximum time which is predetermined and defined to allow the action of the downstream protection systems. If this maximum duration of use has not been reached, the system 1 goes to step 204. If the maximum duration has been reached during step TM, the system 1 goes to step 206.

During step 204, the cut-off branch 10 is closed and the main branch 4 opened and the system 1 goes to step C4.

Step C4 is, as in the first embodiment, a comparison between I and VB. If I is below the low threshold value VB, the system returns to step 202, otherwise it goes again to a step TM.

The step TM checks that the time elapsed from TD does not exceed the predetermined and defined maximum time TP to allow the action of the downstream protection systems. If this maximum duration of use has not been reached, the system 1 remains in step 204. If the maximum duration has been reached during step TM, the system 1 goes to step 206.

Step 206 corresponds to the same state of the system as during step 204. Thus, the main interrupter 5 is kept open. The current passes through the branch 10. The counter-voltage generated by the voltage clipper system 11 causes the current to drop to a low value corresponding to the residual leakage current of the voltage clipper system 11, when the input voltage of the line is applied to the terminals thereof. Step 206 leads to a step C5.

During step C5, the current is compared to a residual current detection threshold Ires. As long as the current remains above Ires, the state 206 is maintained. If the current falls below the Ires threshold and the interrupter 12 is open, one returns to the state 200.

In the embodiments illustrated in FIGS. 1 and 2, the branch 10 ensures both the direct current cut-off function, and, associated with the hashing action of the main interrupter 5, this branch also ensures the direct current limiting function in the case of a low impedance downstream fault, that is to say, a fault whose unlimited current would exceed VH.

The voltage clipper system 11 can be made with varistors, that is to say a strongly non-linear electrical resistor, composed of metal oxide, having a voltage clipper function. Such components can withstand high pulse currents, typically beyond one hundred kiloamperes. It is possible to dimension the varistors in order to withstand the energy dissipated during the limiting phases. However, the service life of the varistors is decreased with each use, and this can lead to a significant oversizing of said varistors, and therefore strongly impact the volume of the solution.

If the system is dimensioned for a large number of current limitations and the voltage clipper element 11 is made by means of varistors, then it is preferable to carry out the limiting function by a system having a large energy absorption capacity relative to the volume thereof, and to reduce the role of varistors to the cut-off function only.

As illustrated in FIG. 3 which illustrates a third embodiment of the system 1, the latter may further comprise a branch 7 dedicated only to the limiting function, while in this embodiment the branch 10 is dedicated exclusively to the cut-off.

Thus, in the third embodiment illustrated in FIG. 3, the limiting branch 7 is coupled in parallel with the main branch 4 between the first terminal B1 and the second terminal B2 and comprises a current limiting module 8. The limiting module 8 can be a set of resistive elements which are assembled in series or in parallel, and whose value allows substantially reaching the desired limiting value for a very low impedance downstream fault. The limiting module 8 has a strong compactness, for example with a capacity to dissipate a megajoule in a volume of less than twenty liters. An opening controllable interrupter 9 must be connected in series to the limiting module 8, in order not to prevent the interruption of the current by the branch 10 if this is desired. The interrupter 9 can typically be made from IGBTs or MOS components.

In order to achieve the desired compactness of the protection system 1, the limiting module 8 comprises a material whose volume heat capacity exceeds two joules per cubic centimeter per degree Celsius. For example, the limiting module 8 can comprise several metal discs with a volume of the order of four hundred cubic centimeters, associated to obtain a total heat capacity of the order of thirty-five kilojoules per degree Celsius so as to dissipate an energy of the order of four megajoules in one hundred milliseconds. The limiting module 8 is for example a carbon-ceramic-based resistance.

With reference to FIG. 7 which illustrates the operation of the third embodiment of FIG. 3, the main switching module 5 is kept closed in the usual case and the system 1 as made in the third embodiment can be used such as the first and second embodiments as described above if an overload current occurs.

System 1 may be stopped during step 300, in which case the branches 4, 7 and 10 are cut.

The system 1 is started in step 301 by closing the main branch 4 and keeping the cut-off branch 10 and the limiting branch 7 open.

The comparison step C1 is identical to the other embodiments.

If I does not exceed In, the first state 301 (usual state) of the system 1 is kept. If it is checked that I exceeds In (I>In), the system 1 goes to step 302.

In step 302, the main branch 4 remains closed, the limiting branch 7 is closed. A new value TS marks the instant from which the overload is detected. TS substantially corresponds to the moment of detection of the appearance of an overload current.

During step C2, I is further compared with In. If I>In is not obtained, the overload fault has disappeared and the system 1 returns to the first state 301. If I>In, step C2 continues with step C3.

During step C3, the relationship I>VH is assessed. If I>VH is not checked, the system 1 returns to step 302 which can lead it, through the comparison step C2, to the first state 301 if the fault has been eliminated. If I>VH is checked, the fault is low impedance and the process continues with a step TM.

Step TM checks that the time elapsed from TD, which corresponds to the first exceeding of VH, does not exceed the maximum time which is predetermined, and defined to allow the action of the downstream protection systems. If this maximum duration has not been reached, the system 1 goes to a step TC. If the maximum duration has been reached by step TM, the system 1 goes to step 303.

A step TC is a switching dead time, for example ten microseconds, which allows being ensured, for the transition of the current from one branch to another, that the branch which will ensure the passage of the current to the next step has had time to be completely closed. Step 303 leads to a step 306 via a step TC.

During step 303, the main branch 4, the limiting branch 7 and the cut-off branch 10 are closed and the system 1 goes to step TC.

During step 304, the main branch 4 is open, the limiting branch 7 is closed and the cut-off branch 10 is open and the system 1 goes to step C4.

Step C4 is, as in the other embodiments, a comparison between I and VB. If I is below the low threshold value VB, the system returns to step 302, otherwise it goes again to a step TM.

Step TM, as in all embodiments, consists in checking that the time elapsed from TD does not exceed the time which is predetermined, and defined to allow the action of the downstream protection systems. If this maximum duration of use has not been reached, the system 1 returns to step 304. If the maximum duration of use has been reached during step TM, the system 1 goes to step 305.

During step 305, the main branch 4 is open, the limiting 7 and cut-off 10 branches are closed and the system 1 goes to step 306 via a step TC.

During step 306, the system 1 has reached the permissible maximum time of the cut-off module 11 but the fault has not been eliminated by a downstream device. The system 1 therefore operates in cut-off mode as in the previous embodiments, in the comparable steps 106 and 206.

Thus, during step 306, the cut-off branch 10 is closed and the main 4 and limiting 7 branches are open, which allows a cut-off function by the system 1 to protect the rest of the circuit 2.

Step 306 corresponds to the same state of the system as during step 304. Thus, the main switch 5 is kept open. The current flows through the branch 10. The counter-voltage generated by the voltage clipper system 11 causes the current to drop to a low value corresponding to the residual leakage current of the voltage clipper system 11, when the input voltage of the line is applied to the terminals thereof. Step 306 leads to a step C5.

During step C5, the current is compared to a residual current detection threshold Ires. As long as the current remains above Ires, the state 306 is maintained. If the current goes below the threshold Ires and the interrupter 12 is open, one returns to the state 300.

Figure 9:
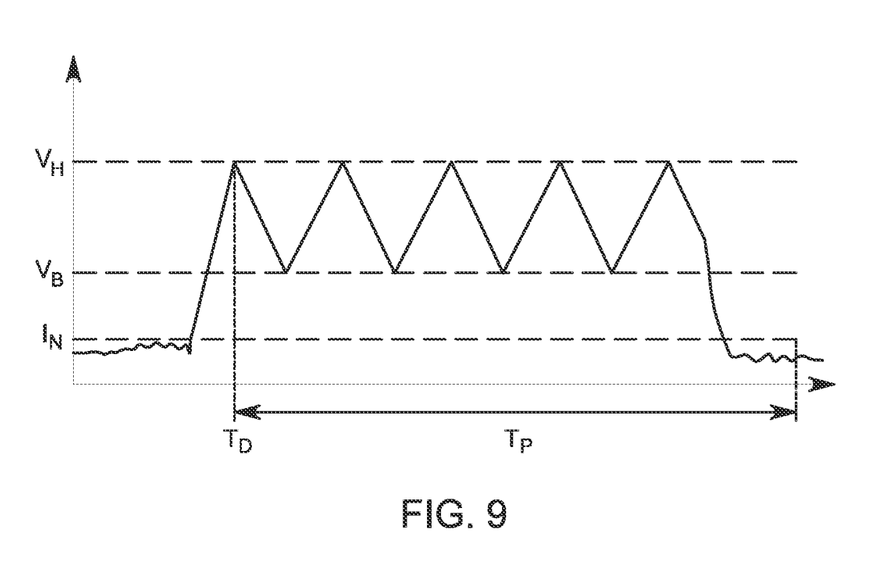
FIG. 9 illustrates the evolution of the current delivered by the second terminal of the protection system during a fault whose current is limited by the device of the invention in a hashing mode and then is eliminated by a downstream protection device.

By the successive steps 302, C2, C3, TM, TC, 304 and C4, the system can make a hashing loop in which the main branch 4 is alternately open and closed and the current is successively lowered and raised between the values VB and VH, as illustrated in FIG. 9.

In the first operating mode 301, the system 1 keeps the main switching module 5 closed to guarantee the conduction in the main branch 4 through the main switching module 5 which is turned on. In the case of a low impedance fault occurring in the first operating mode 301, the circuit 2 generates a command for closing a second auxiliary switching module 9 (step 302) followed by a command to open the main cut-off module 5, so as to reach the second operating mode (step 304). Thus, the first auxiliary switch 12 is always open between the first state 301 and the second state, called limiting state 304.

Preferably, the control 6B and monitoring 6C means detect, in advance, the appearance of an overcurrent, occurring at a time TD when the high threshold intensity VH is crossed, or a time TS when the nominal intensity In is crossed. The control means 6B then generate the opening command during step 304 only after the waiting time TC, for example ten microseconds, in order to leave time for closing the limiting branch 7 to ensure the continuity of the current flow. The threshold intensity VH which corresponds to the activation of the limiting branch 7 could for example be at least equal to twice the intensity of the nominal current In, in order to limit the risks of inadvertent opening of the main branch 4 Thus, the monitoring 6C and control 6B means are configured to apply control signals to the main switching module 5 and also, where appropriate, to the auxiliary switching modules 9, 12, in order to selectively obtain the respective openings or closures thereof. The use, if it takes place, of the cut-off branch 10, is done by the successive steps 303, TC, 306 or 305, TC then 306 if the limiting maximum period has been reached.

In the second state 304 of the protection system 1, the main switching module 5 is opened and the limiting module 8 lowers the intensity to a value called limited intensity. The intensity limited by the limiting module 8 is defined by the intrinsic characteristics thereof as well as the impedance of the outer circuit, in particular the equivalent impedance of the downstream elements 3 during the fault. The low threshold intensity VB and limited intensity values may be equal. The limited intensity value is less than the high threshold current VH which triggers the opening of the main switch 5 followed by the entry into action of the limiter 8 thanks to the control means 6B. For example, the high threshold intensity VH is equal to two hundred and twenty percent of the nominal current value In.

The means 6B for controlling the state of the main switching module 5 are configured to switch the main switch 5 between the first and second operating states (101, 201, 301, 104, 204, 304). The first state (101, 201, 301) is the usual nominal mode, in which the main switch 5 is in a closed state and a nominal current can flow through the protection system 1 in the main branch 4. For example, in the first state (101, 201, 301), the main switch 5 is electrically turned on with low intrinsic resistance. In the first state (101, 201, 301), the current delivered by the first terminal B1 is substantially integrally oriented towards the main branch 4 which is turned on.

In the second state (104, 204, 304), or limiting mode, the main switching module 5 is in an open state and constitutes a cutout of the main branch 4 and the limiting branch 7 is turned on. The current delivered by the first terminal B1 then flows towards the limiting branch 7 to the second terminal B2.

Figure 8:
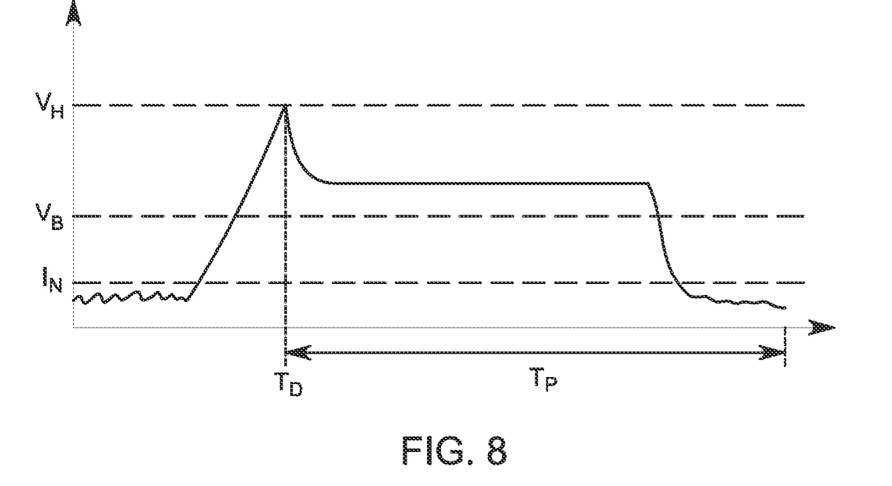
FIG. 8 illustrates the evolution of the current delivered by the second terminal of the protection system during a fault whose current is limited by the device of the invention in a linear mode, then is eliminated by a downstream protection device.
Figure 10:
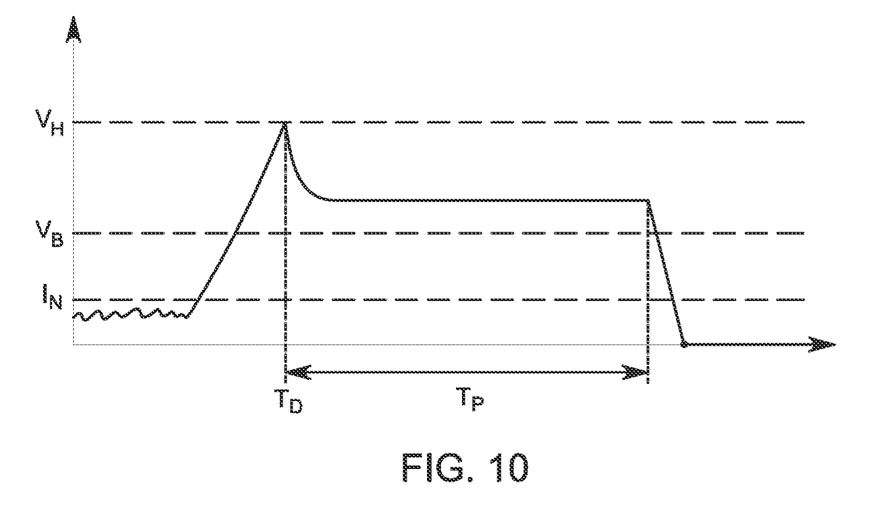
FIG. 10 illustrates the evolution of the current delivered by the second terminal of the protection system during a fault whose current is limited by the device of the invention in a linear mode then is eliminated by said device after a predetermined time.

As illustrated in FIGS. 8 and 10, if in the second state (104, 204, 304) the current remains greater than the low threshold VB, one remains in this state where the current limitation is of the linear type, without hashing. If, as illustrated in FIG. 8, the fault is eliminated by a downstream protection device of the circuit 3, one returns to the first state (101, 201, 301) by passing transiently through the second state. If, as illustrated in FIG. 10, the fault has not been eliminated by the downstream device, and that the current remains greater than the low threshold VB, then as soon as the time elapsed from TD, initiated when the current at the input of the terminal B1 for the first time exceeds VH, exceeds the predefined time TP, the device 1 then interrupts the current by step 306 via step 305.

As long as the fault has not been eliminated during the limiting step 104, 204, 304, the comparison C4 of the current of the first terminal B1 relative to the low threshold value VB, the method continues towards step 102 202, 302 of limiting or 106 206, 306 of cutting-off, in particular according to the operating time of the system 1 compared to the maximum time TM.

Furthermore, the control 6B and monitoring 6C means are capable of detecting that the current delivered by the second terminal B2 reaches the low threshold value VB by an upper value and of closing the main switch 5 if necessary during step 104, 204, 304.

The control means 6B can thus operate the electrical circuit 2 despite an overload at the first terminal B1 by monitoring the protection system 1 in a mode called hashing mode, corresponding to the step and comparison loops 102 C2 C3 Tm 104 C4 for the first embodiment, 202, C2, C3, TM, 204, C4 for the second embodiment and 302, C2, C3, TM, TC, 304, C4 for the third embodiment.

In the third embodiment, in hashing mode, the limiting branch 7 is kept continuously closed, in which case only the main switching module 5 switches repeatedly, between steps 302 and 304.

Figure 11:
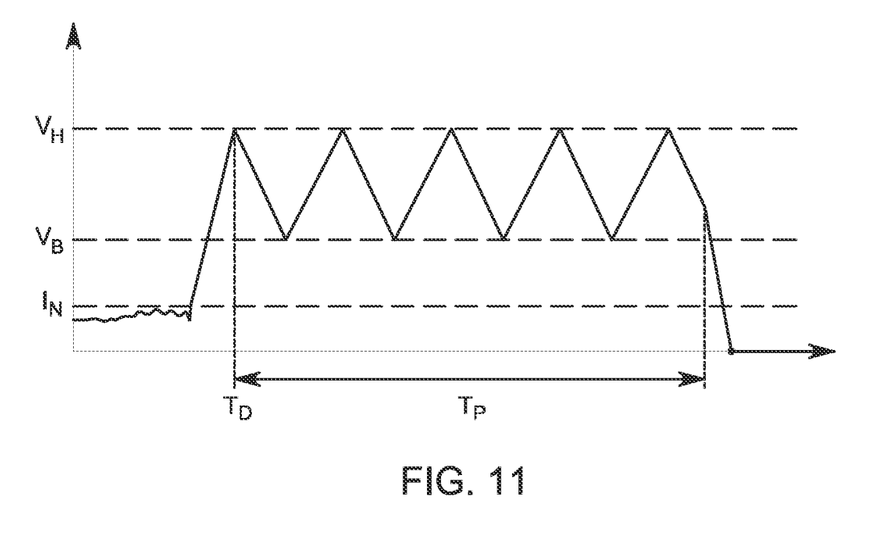
FIG. 11 illustrates the evolution of the current delivered by the second terminal of the protection system during a fault whose current is limited by the device of the invention in a hashing mode then is eliminated by said device after a predetermined time.

The behavior of the current delivered by the second terminal B2 in the hashing mode is illustrated in FIGS. 9 and 11. Thus, in this mode, the main branch 5 is alternately open and closed so as to maintain the current delivered by the second terminal B2 below the threshold value VH and above the threshold value VB which are predefined for the operation of the circuit 2.

If, as illustrated in FIG. 9, the fault is eliminated by a protection device placed downstream of the circuit 3, one returns to the first state (101, 201, 301) by passing transiently through the second state. If, as illustrated in FIG. 11, the fault has not been eliminated by the downstream device, and the current remains greater than the low threshold VB, then as soon as the time elapsed from TD, initiated when the current at the input of the terminal B1 is greater for the first time than VH, exceeds the predefined time TP, the device 1 then interrupts the current by step 306 via step 303 or 305.

The monitoring means 6C can include in particular a microprocessor, random access memory, read only memory, a communication bus and communication inputs/outputs. The monitoring means 6C can include or be connected to sensors 6D, in particular Hall effect current (or voltage) sensors measuring the current at various points of the protection system 1 or of the electrical circuit 2 in which the protection system 1 is integrated. In a simple version, the monitoring means 6C can include, for example, a 6D measuring device intended to measure the intensities delivered by the first or second terminals, a comparator provided with an internal clock and a communication bus. The monitoring means 6C can be dedicated to the device or form part of a control circuit monitoring other elements of the circuit 2. For example, during step TM, the monitoring means 6C compare the duration elapsed since the time TD from which a limiting has started to a maximum duration provided for the operation of the downstream protections, for example one hundred milliseconds.

The monitoring means 6C are configured to detect an overcurrent of the current delivered by the first terminal B1 during step C1 in which its intensity is compared with the value In. The circuit 2 can for this purpose receive a measurement of the current passing through the terminal B1, by means of a 6D measuring means. In the absence of overcurrent, the system 1 remains in the first state 301. If a crossing of the current value VH is detected during step C4, the circuit 2 switches from the first operating mode 301 to the second operating mode 304 in which the system 1 must limit even cut-off the current (step 306) delivered to the second terminal B2.

In the third embodiment, the limiting branch 7 comprises a second auxiliary switching module 9 comprising a controlled static transistor which can be kept open (usual case) or exceptionally closed by the control means 6. The second auxiliary switch 9 is an opening controllable semiconductor, for example an insulated gate bipolar transistor (IGBT) or a MOSFET. The closure of the second auxiliary switching module 9 is performed in step 302, just before the opening during step 304 of the main branch 4. Thus, an overload detection (step C1) leads to the closure during step 302 of the limiting branch 7 by means of the second auxiliary switch 9. For example, the second auxiliary switch 9 is configured to be closed in step 302. This auxiliary interrupter 9 is necessary to ensure the open state of the device 1 in step 300, and to allow cutting-off the current in step 306.

Step 104 204, 304 includes the opening of the main switching module 5, therefore of the main branch 4. In the second embodiment, this opening is allowed by the prior closing of the cut-off branch 10 made or kept turned on during step 202. In the third embodiment, this opening is allowed by the prior closing of the limiting branch 7 made or kept turned on during step 302. It triggers the start of the limiting during step 104 204, 304 at a time substantially close to the detection TD, which corresponds to exceeding by the current at the terminal 1 of the threshold VH, which can, for example, be recorded by a clock of the monitoring means 6C so as to include, during the comparison step TM, the predefined time limiting TP, corresponding to a duration allowing, if necessary, the downstream protections to eliminate the fault in their branch, and thus allow ensuring the selectivity of the protections.

For example, a cut-off switching step 206, 306), which ends the limiting step 204, 304, can occur when the intensity measurement of the terminal B1 exceeds the low value threshold VB for a certain duration (for example more than twice the nominal current for more than one hundred milliseconds).

Indeed, it is considered that the downstream protections, that is to say the protections included in the downstream distribution network 3, must be able to operate in a time less than the duration TM, typically of one hundred milliseconds, for a sufficient current level to ensure the selectivity of these downstream protections. If the current in the terminal B1 remains greater than the minimum threshold VB, this means that the downstream protections have not operated or that the fault is located between the protection element 1 and the downstream network 3. In a case such as in the other device 1 must open to cut-off the fault current, by going from step 104, 204, 304 to step 106, 206, 306.

Thus, the protection system 1 allows protecting the components downstream of the circuit 2 by combining technologies for cutting-off and limiting a fault current limiting while using a very compact resistive module 8.

Upon receiving a closing order by the control means 6, the main switching module 5 is for example provided to be closed with a defined delay time, for example ten microseconds, in order to allow time for the first and/or second auxiliary switches 9, 12 to be close and allow the establishment of the currents in the limiting 7 and cut-off branches 10.

The invention claimed is:

1. An electrical protection system for direct current and medium voltage electrical circuit, comprising,
   a voltage clipper system connected between a first terminal and a second terminal, configured to generate a counter-voltage for a current passing therethrough which is equal to more than a few percent of a nominal current of the electrical circuit so as to decrease the intensity of the output current of the protection system;
   a main switching module coupled in parallel to the voltage clipper system, characterised in that the main switching module is configured to switch between a first state in which the main switching module is turned on and a second state in which the main switching module forms a cutout;
   a limitation branch coupled in parallel to the main switching module between the first terminal and the second terminal, said limitation branch comprising a resistive limitation module and a second auxiliary switching module coupled in series with the current limiting module and configured to be closed until the main switching module is in position in its second state; and
   a first auxiliary switching module coupled in series with the voltage clipper system configured to be closed to enter the coupling position of the second auxiliary switching module according to the exceeding of a threshold by the current and a time elapsed since an instant initiated as soon as the current exceeds said threshold compared with a maximum admissible default time,
   wherein the main switching module is configured to (1) position the main switching module in the second state as soon as the current flowing in the first terminal reaches a high limit value from lower value and (2) switch the main switching module into the first state as soon as the intensity of the current passing through the second terminal reaches a lower limit value from upper value where the main switching module is in the second state.

2. The protection system according to claim 1, wherein the voltage clipper system is a non-linear resistive element which comprises a metal oxide.

3. The protection system according to claim 1, wherein the limiting module comprises a material whose volume heat capacity exceeds 2 J/cm$^3$/° C.

4. The protection system according to claim 1, wherein the main switching module comprises a conduction electrode and the control means are configured to control the opening of the main switching module depending on the variation of an electrical magnitude of the conduction electrode thereof, in order to limit the increase in voltage as a function of time to a predefined value.

5. The protection system according to claim 1, characterised in that it can be included in a parallelepiped having a volume less than one cubic meter.

6. The protection system according to claim 1, wherein a cut-off branch, coupled between the first terminal and the second terminal in parallel with a main branch, comprises the first auxiliary switching module and the voltage clipper system.

* * * * *